Aug. 14, 1923.
V. BEAUREGARD
EGG LIFTER
Filed Aug. 12, 1922
1,464,967
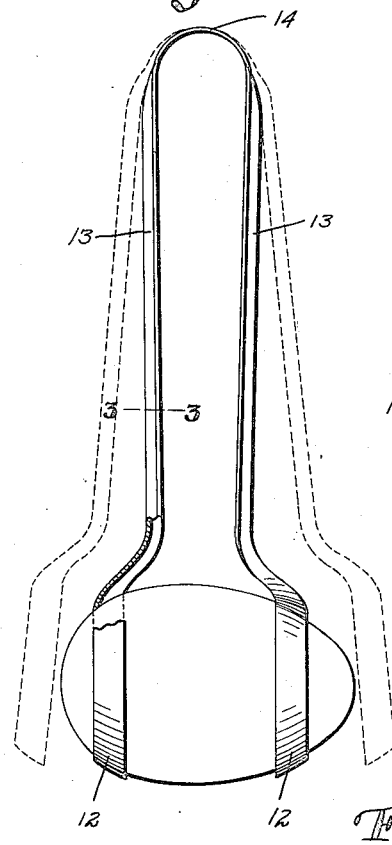
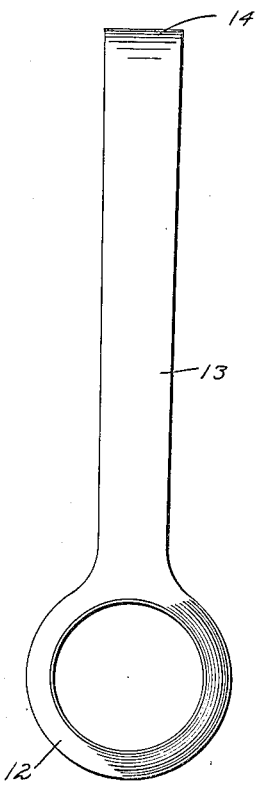
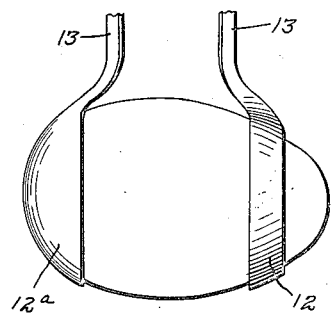

Patented Aug. 14, 1923.

1,464,967

UNITED STATES PATENT OFFICE.

VICTOR BEAUREGARD, OF BOSTON, MASSACHUSETTS, ASSIGNOR OF ONE-HALF TO JOSHUA HUGHES, OF SOMERVILLE, MASSACHUSETTS.

EGG LIFTER.

Application filed August 12, 1922. Serial No. 581,405.

*To all whom it may concern:*

Be it known that I, VICTOR BEAUREGARD, a citizen of the United States, residing at Boston, in the county of Suffolk and State of Massachusetts, have invented new and useful Improvements in Egg Lifters, of which the following is a specification.

The object of the invention is to provide a device whereby an egg may be lifted from boiling water, and held to permit the breakage of an end portion of the shell, and the pouring of the substance into a receptacle.

The invention is embodied in the improved egg-lifting or handling device hereinafter described and claimed.

Of the accompanying drawings forming a part of this specification,—

Figure 1 is an elevation of my improved lifter, looking toward the edges of the annular jaws and the handle.

Figure 2 is an elevation showing one side of the handle, and one side of one of the jaws.

Figure 3 is a section on line 3—3 of Figure 1.

Figure 4 is a view similar to portions of Figure 1, showing a modification.

The same reference characters indicate the same parts in all of the figures.

In the drawings, 12, 12 represent a pair of annular jaws, formed to embrace two zones of an egg shell between the largest diameter and the ends of the shell, the jaws being proportioned to permit the end portions of the shell to project through the jaw openings, as shown by Figure 1, so that said portions are exposed, and either may be broken to liberate the egg substance.

The jaws 12 are formed on the free end portions of an elongated handle, composed, in this instance, of arms 13, 13, and a resilient neck 14, connecting the arms, and normally holding the handle expanded, as indicated by dotted lines in Figure 1, so that the jaws are normally spaced apart to receive the major axis of the shell therebetween. The handle maintains the jaws in opposition to each other, so that when the handle is compressed by the hand of the user, the shell is firmly grasped by the jaws, and may be held first in position to permit the breakage of an exposed end portion of the shell, and then in position to pour the egg substance through the broken end into a cup. The shell may also be held in position to permit the removal of the egg substance by a spoon.

I prefer to make the device from a single piece or blank of sheet metal, bent and fashioned as shown by the drawings, the arms 13 being concavo-convex in cross section, as shown by Figure 3.

The jaws may be formed to expose only one end portion of the shell, as shown by Figure 4, and may include an annular jaw 12, such as has already been described, and a cupped jaw 12ª, formed to entirely cover one end portion of the shell.

I claim:

1. An article for the purpose described formed from a sheet metal blank having a relatively narrow, elongated body and expanded end portions, the body being bent to form resilient handle sections and said end portions being shaped to provide oppositely beveled seats on the adjacent faces adapted to completely encircle an egg near its ends, when the handle sections are compressed to draw the jaws into engagement therewith and to expose one end thereof.

2. An article for the purpose described formed from a sheet metal blank having a relatively narrow, elongated body and expanded end portions, the body being bent to form resilient handle sections acting to normally separate the expanded ends, one of said ends being cupped to receive one end of an egg and the other being apertured to permit the opposite end of the egg to extend therethrough when the handle sections are compressed to draw the jaws into engagement with an egg positioned between them.

3. An article for the purpose described formed from a sheet metal blank, slightly concaved in cross section on its inner face, having an elongated body and expanded end portions, the body being bent to form resilient handle sections acting to normally separate the expanded ends and said end portions being each shaped to completely encircle an egg when the handle sections are compressed to draw the jaws into engagement therewith and expose one end thereof.

In testimony whereof I have affixed my signature.

VICTOR BEAUREGARD.